US006641336B1

(12) United States Patent
Bolles

(10) Patent No.: US 6,641,336 B1
(45) Date of Patent: Nov. 4, 2003

(54) HIGH PRESSURE FEEDER ROTOR HAVING CONDUITS FOR PRESSURE EQUALIZATION

(75) Inventor: John F Bolles, Queensbury, NY (US)

(73) Assignee: Andritz Inc., Glens Falls, NY (US)

( * ) Notice: Subject to any disclaimer, the term of this patent is extended or adjusted under 35 U.S.C. 154(b) by 0 days.

(21) Appl. No.: 10/388,401

(22) Filed: Mar. 17, 2003

(51) Int. Cl.⁷ .............................................. B65G 53/08
(52) U.S. Cl. ........................................ 406/63; 406/183
(58) Field of Search .............................. 426/62, 63, 64, 426/65, 66, 67, 68, 181, 182, 183

(56) References Cited

U.S. PATENT DOCUMENTS

| 3,993,227 A | | 11/1976 | Oettinger |
| 4,338,049 A | | 7/1982 | Richter et al. |
| 4,354,777 A | * | 10/1982 | Richter et al. ................ 406/63 |
| 4,372,338 A | | 2/1983 | Efferson |
| 4,372,711 A | * | 2/1983 | Richter et al. ................ 406/63 |
| 4,415,296 A | * | 11/1983 | Funk ........................... 406/19 |
| 4,430,029 A | | 2/1984 | Richter et al. |
| 4,516,887 A | * | 5/1985 | Richter et al. ................ 406/63 |
| 5,236,285 A | | 8/1993 | Prough |
| 6,468,006 B1 | | 10/2002 | Prough |

* cited by examiner

Primary Examiner—Joseph A. Dillon
(74) Attorney, Agent, or Firm—Nixon & Vanderhye, P.C.

(57) ABSTRACT

A conduit extends laterally through a rotor of a high pressure feeder to relieve any unequal pressures acting on opposite ends of the rotor. The conduit allows slurry under extraordinarily high pressure at one end of the rotor, to flow laterally through the rotor, and be released through the opposite end of the rotor into the rotor housing.

6 Claims, 4 Drawing Sheets

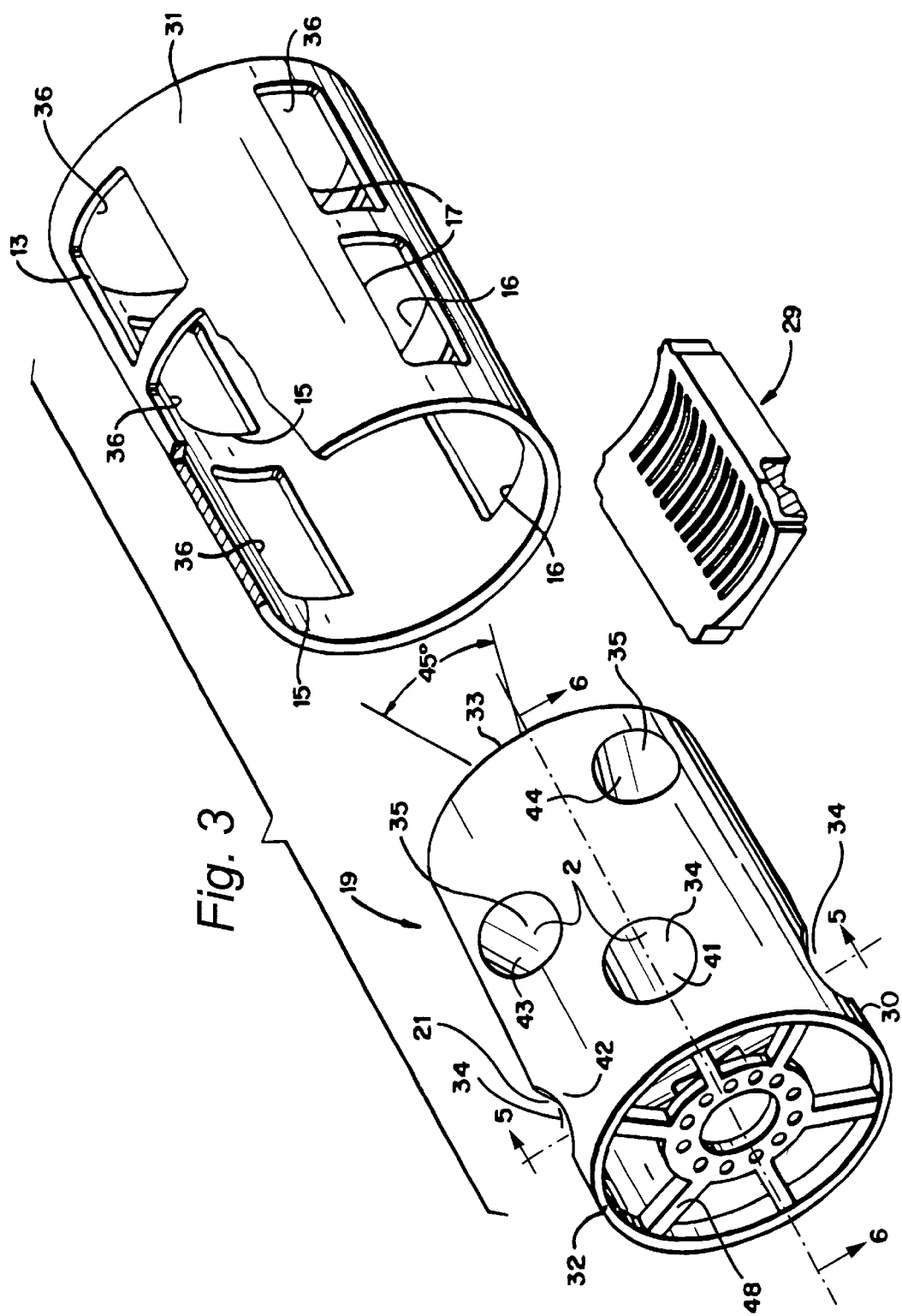

HIGH PRESSURE FEEDER ROTOR HAVING CONDUITS FOR PRESSURE EQUALIZATION

BACKGROUND OF THE INVENTION

A High Pressure Feeder ("HPF") is an commonly used device to process comminuted cellulosic fibrous material, such as wood chips, to produce cellulose pulp. An exemplary HPF is shown in U.S. Pat. No. 5,236,285. The HPF is a pressure interface device between a low pressure stream and a high pressure stream, whereby fibrous material in the low pressure stream can be injected into the high pressure stream that may feed to a pressurized vessel, such as a digester. The HPF may be a rotary valve-type device that, with the aid of a high-pressure pump, transfers a slurry of material and liquid at a low pressure for example, between about 0 to 2 bar gauge, to a second higher pressure, for example, between about 5–15 bar gauge.

The high pressure slurry flow passing through a HPF applies large forces to the components, housings and joints within the HPF. High pressure feeders are designed to withstand these large pressures. However, if the high pressures are applied unequally within the HPF, there is a danger that a large pressure differential can damage the HPF. Equalizing the pressures on the rotor in the HPF is one technique used to enable the HPF to withstand internal high pressures.

Within a HPF, the ends of rotors is one area that has to withstand high pressures. Under conventional operation, the pressures acting on the opposite ends of the rotor are equalized by an external pipe mounted to the HPF housing. Equalized pressure balances the pressure forces acting on opposite ends of the rotor. However, if the pressure on one end of the rotor is substantially higher than the pressure on the opposite end, the unequal forces acting on the rotor ends press the rotor axially against the HPF housing. These axial rotor forces can damage the rotor, the bearings supporting the rotor, and the HPF housing. In extreme cases, the axial pressures may cause the rotor to burst out an end of the HPF housing.

Traditionally, a pressure equalization pipe has been installed in a HPF to ensure that the pressure at both ends of the rotor is equalized. The pressure equalization pipe couples one end of the rotor housing to the other, and spans the length of the housing. The pressure equalization pipe is external to the HPF housing and must be added to the housing during assembly of the HPF. The pressure equalization pipe is prone to damage, exposed to weather, is subject to tampering, and is an additional component that increases the expense of a HPF. In view of these shortcomings of an external pressure equalization pipe, there is a long-felt need for a means to ensure pressure equalization around the rotor of a HPF that does not require the external components of the conventional pressure equalization pipe.

SUMMARY OF INVENTION

A conduit extends laterally through a rotor of a HPF to relieve any unequal pressures acting on opposite ends of the rotor. The conduit allows slurry under extraordinarily high pressure at one end of the rotor, to flow laterally through the rotor, and be released through the opposite end of the rotor into the rotor housing.

In one embodiment, the invention is a high pressure transfer device comprising: a pocketed rotor containing a plurality of through going pockets, said rotor rotatable about a given axis of rotation and said pockets having opposite end openings which function as both inlets and outlets depending upon the angular position of the rotor and said pockets are provided in at least first and second sets; a housing enclosing said rotor and having an exterior periphery and first through fourth ports disposed around the exterior periphery thereof for registry with the inlets to and outlets from said through going pockets, wherein the rotor is mounted in said housing for rotation with respect to said ports about said given axis of rotation; and said rotor having at least one conduit extending axially through the rotor and having openings at opposite ends of said rotor to provide pressure equalization at said opposite ends.

In a second embodiment, the invention is a high pressure transfer device comprising: a pocketed rotor containing a plurality of through going pockets, said rotor rotatable about a given axis of rotation and said pockets having opposite end openings which function as both inlets and outlets depending upon the angular position of the rotor; a housing enclosing said rotor having first through fourth ports disposed around the exterior periphery thereof for registry with the inlets to and outlets from said through going pockets; said rotor mounted in said housing for rotation with respect to said ports about said given axis of rotation; and said rotor having end plates at opposite axial ends of said rotor, wherein said end plates have at least one slot open to a conduit extending axially through said rotor, such that said at least one slot in said end plates and said conduit provide pressure equalization between said axial ends of the rotor.

BRIEF DESCRIPTION OF THE DRAWINGS

FIG. 3 is an exploded perspective view of a HPF rotor and rotor sleeve;

DETAILED DESCRIPTION OF THE DRAWINGS

Figure 2:
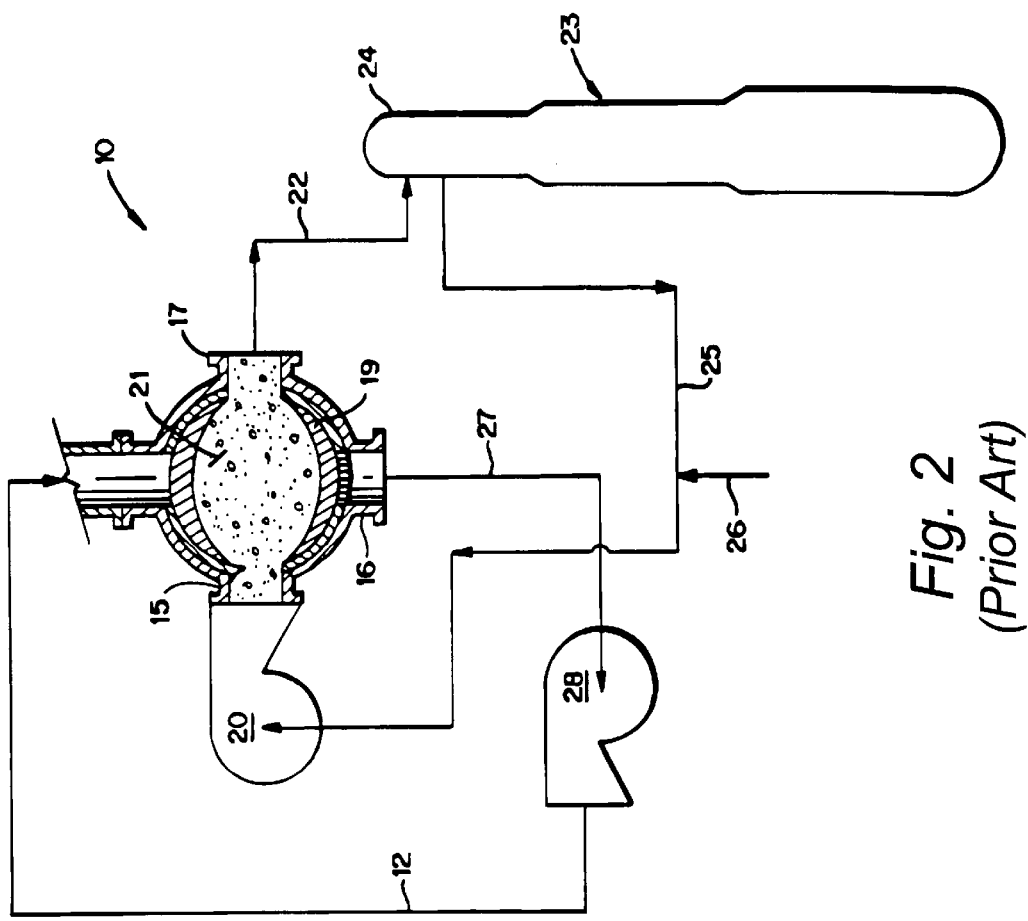
FIGS. 1 and 2 schematically illustrates the conventional filling (FIG. 1) and emptying (FIG. 2) of a HPF pocket with a fibrous slurry.
Figure 1:
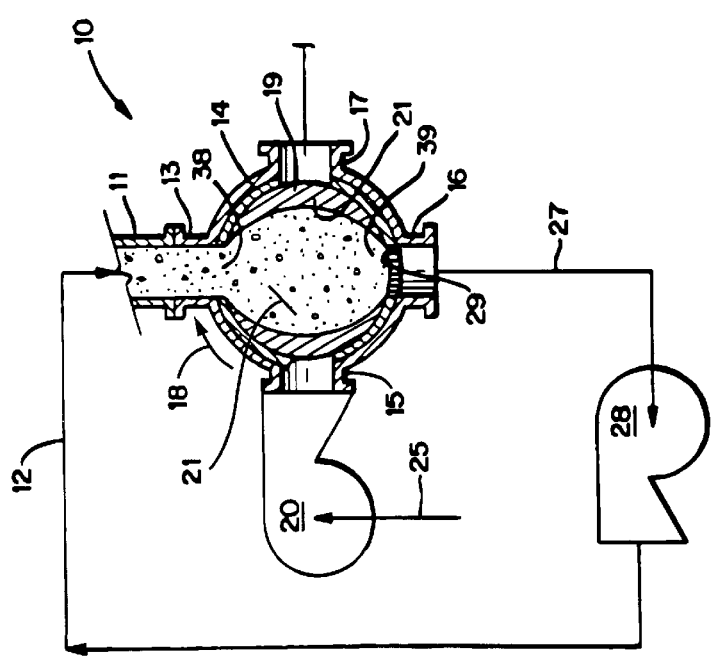

FIGS. 1 and 2 illustrate the operation of a high pressure feeder (HPF). FIGS. 1 and 2 schematically illustrate the operation of a high pressure transfer device 10 having a low pressure inlet port 13 connected to a chip chute or chip tube 11, which is supplied with steamed chips from a conventional steaming vessel, for example, from a horizontal screw-type steaming vessel or from a Diamondback® steaming vessel, marketed by Andritz Inc, of Glens Falls, N.Y. The chips are typically slurried by a source of liquid, for example, from line 12. The chute or tube 11 is connected to the low-pressure inlet port 13 of a metal housing 14. The housing 14 also has a high-pressure inlet port 15, a low-pressure outlet port 16, and a high-pressure outlet port 17, disposed at approximately 90° intervals in the direction of rotation 18 (the direction of rotation may be in the direction 18, or an opposite rotational direction) of a pocketed rotor 19 disposed within the housing 14.

As shown in FIG. 1, a pocket 21 of the rotor, when aligned with the HPF pressure inlet port 13, is filled with a chip slurry from the chip tube 11. After the rotor makes a quarter turn as shown in FIG. 2, the slurry filled pocket is aligned with a high pressure inlet port 15 which is connected to a high pressure pump 20 or other source of high pressure. The slurry in the pocket 21 is flushed by the pump 20 through the HPF high pressure outlet port 17 and into a conduit 22, which may be a "top circulation line". The line 22 feeds the slurry of chips and liquid under pressure to the top 24 of a continuous digester 23 or a batch digester.

At the top 24 of conventional digester is generally a solids/liquid top separator which returns some of the liquid slurrying the chips in the line 22 via a conduit 25, which is ultimately connected to the inlet of the high pressure pump 20. The liquid in lines 22, 25 typically is a combination of cooking liquor, for example, kraft white liquor, wood moisture, steam condensate, and sometimes black liquor. Additional liquid may be added to the return line 25 from make up line 26. For non-kraft situations, the liquid in lines 22, 25 may be water, sulfite cooking liquor, or solvent pulping liquid, among others.

Connected to the low pressure outlet port 16, and providing a suction thereto, is a suction line 27 connected to a low pressure pump 28, the pump 28 in turn being connected to the line 12 to supply slurrying liquid to the chip chute 11. If the device 10 is fed by a slurry-type pump as described above, the pump 28 may not be necessary since the slurry is sufficiently pressurized by the slurry pump.

Mounted within the HPF housing 14 at the low pressure outlet port 16 is a screen, typically, one of the two screens 29. As seen in FIG. 1, the screens 29 allow liquid to pass into the conduit 27 under the influence of the suction of pump 28, or the pressure of an upstream slurry pump, while the chips or like cellulosic fibrous material cannot pass through the screen 29 and, therefore, remain in the rotating pocket 21 in the rotor 19. Accordingly, the chips or other fibrous material flowing through the low pressure inlet 13 is retained in the pocket 21 until the pocket 21 is aligned with the high pressure outlet 17, where the chips and fibers are flushed through the outlet 17 into high pressure conduit 22.

Figure 7:
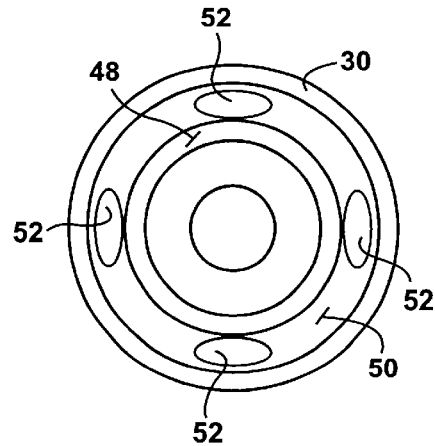
FIG. 7 is an end view of a rotor shell showing slots in a rotor end plate for pressure equalization.

FIG. 3 illustrates a rotor 19 and stationary liner 31 of a fabricated rotor. The rotor is fabricated from a cylindrical shell 30 with pockets formed of generally straight conduits mounted in the cylindrical shell 30. The cylindrical shell 30 may be formed from a centrifugal casting of stainless steel and have a machined taper. The rotor shell 30 may be tapered from a first end 32 thereof to a second end 33. The ends of the shell are capped with an end plate 50, which is shown in FIG. 7. The end plates are not shown in FIG. 3 so that can be shown the wheel 48 with support spokes at each end of the shell.

The rotor shell 30 includes a plurality of (e.g., four 41 to 44) diametrically through-going pockets 21. Typically two pockets 41, 42 are arranged in a first set 34 and two pockets 43, 44 are arranged in a second set 35, where the sets spaced along the axis of rotation of the rotor. The pockets of one set 34 are offset with respect to the pockets of the other set 35 by, for example, 45 degrees. The ends of the pockets of each set sequentially align with the inlet and outlet ports 13, 15, 16 and 17 of the HPF housing 14 during the rotation of the rotor.

The rotating shell 30 fits within a stationary cylindrical shell liner 31. The liner 31 includes assorted openings 36 that are aligned with the inlet 13, 15 and outlet ports 16, 17 of the HPF housing, the reference numbers of which ports are marked on the liner for reference. The openings 36 in the liner communicate with the ends of the rotor pockets 21 and housing ports 13, 15, 16 and 17. The liner may include or be adjacent to one of the screens 29.

Figure 4:
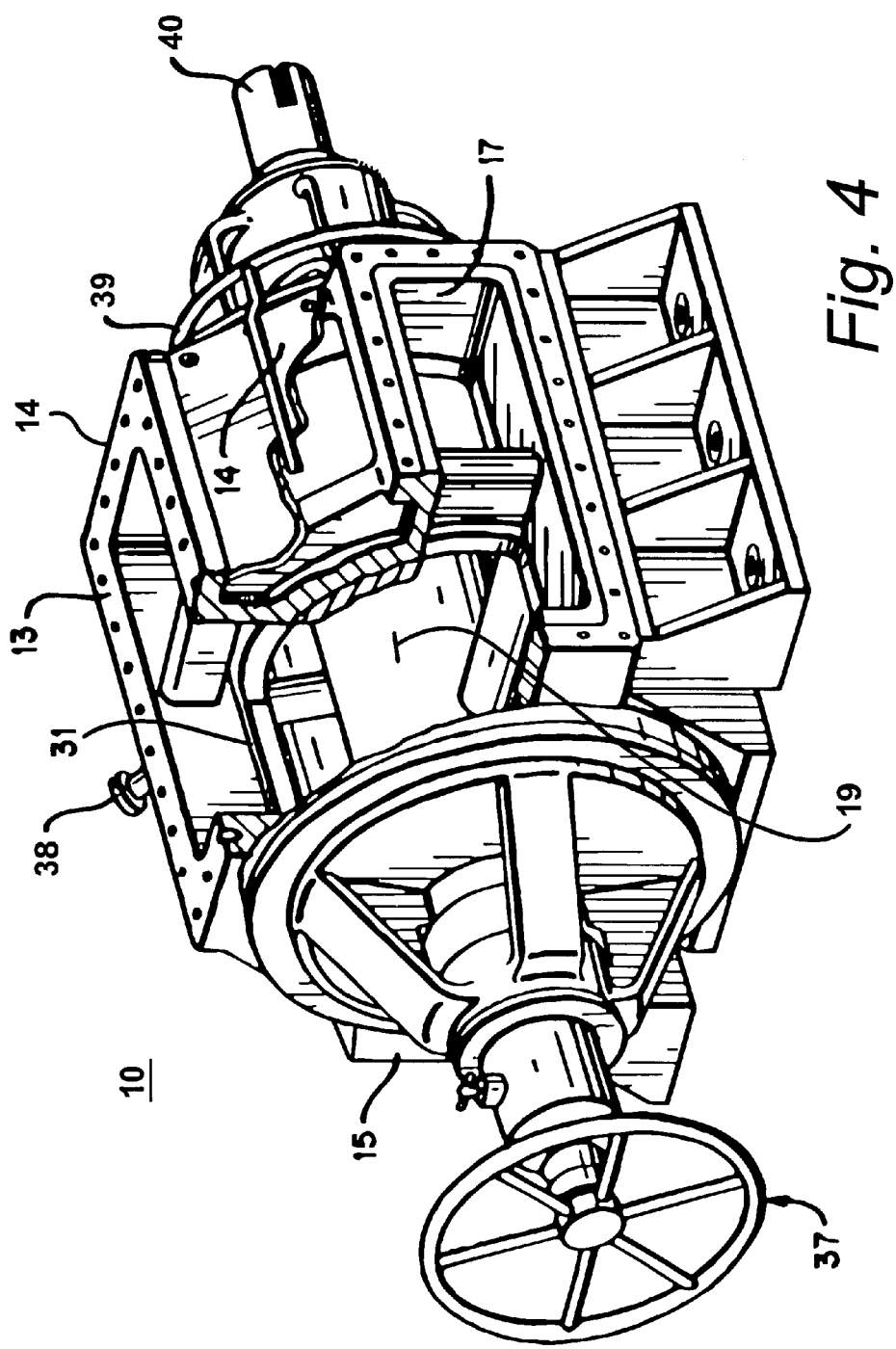
FIG. 4 is a perspective view of a HPF rotor housing, with a portion of the housing cut-away to expose the rotor.

FIG. 4 is a perspective view of a HPF housing 14, with a cut away section to show the rotor 19. A conventional plug clearance adjustment mechanism 37 can be provided for adjusting the axial position of the tapered rotor 19 within the shell liner 31. Such axial adjustments of the rotor with respect to the liner can be used to clear fibers and other debris stuck between the rotor shell and liner. The housing 14 may be provided with other conventional components such as a white liquor purge connection 38, a preheat header 39, and a shaft 40-connected to a power source for rotating the rotor 19 and to the rotor itself. However, a pressure equalization line (See e,g., reference number 34 in U.S. Pat. No. 5,236,285) is not needed, even though such external lines exist on conventional HPF housings.

Figure 5:
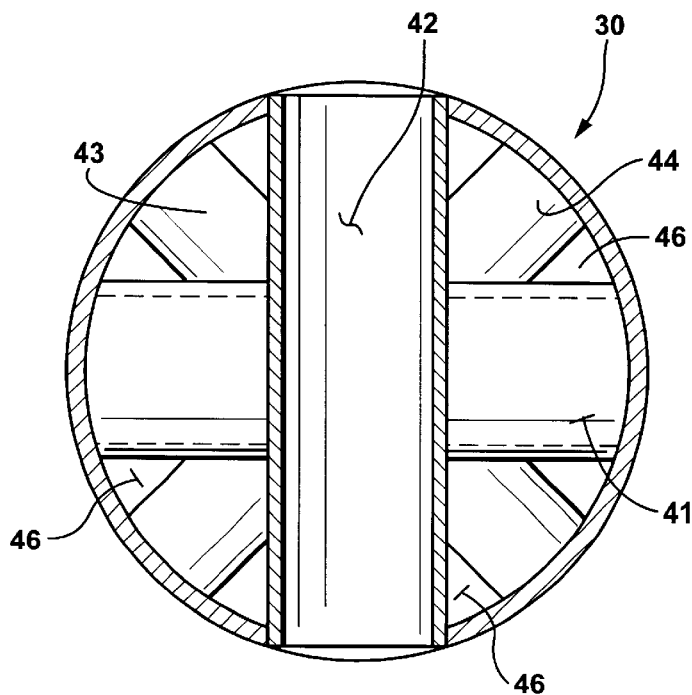
FIGS. 5 and 6 are orthogonal cross-sectional views of the rotor shell with passages taken along lines 5—5 and 6—6, respectively, in FIG. 3.
Figure 6:
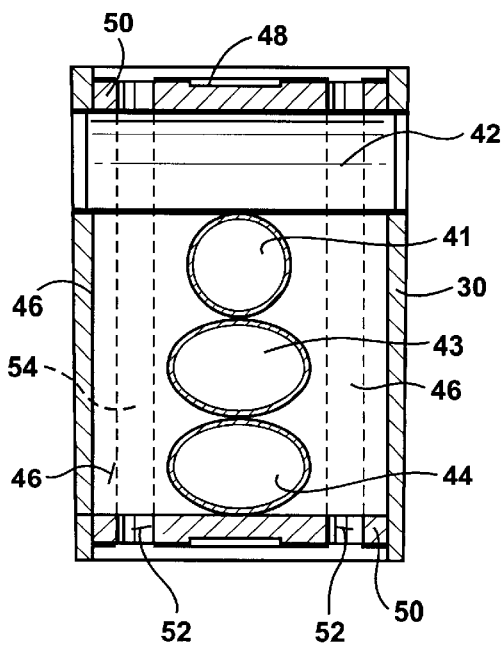

FIGS. 5 and 6 are cross-sectional views of the rotor shell 30 shown in FIG. 3, in which pocket passages 41, 42, 43 and 44 have been added to the shell. FIG. 5 shows a cross-sectional view of the rotor shell taken along line 5—5 in FIG. 3; FIG. 6 is a cross-sectional view taken along line 6—6 in FIG. 3. The passages 41, 42, 43 and 44 are mounted in the rotor shell and extend between opposite sides of the shell. The pockets each form a conduit through the rotor for the slurry of fiber and cooking liquor. The conduit may be a straight through passages through the rotor. The cross-sectional shape of conduit in each pocket may be uniform through the length of the pocket so as to form a uniform flow passage through the conduit. The cross-sectional shape may be elliptical, circular, entirely or partially curvilinear, or rectangular.

As shown in FIGS. 5 to 7, a rotor fabricated from a metal cylinder is generally hollow 46, except for the first through fourth pockets and the end plates of the shell. The remaining interior volume of the shell is generally hollow. This hollow interior region of the shell may serve as a conduit 46 for pressure equalization. The interior volume 46 of the rotor cylinder shell is not entirely filled by the pockets 41 to 44. The interior portions of the shell that do not form pockets may be used to provide a lateral conduit along the length of the rotor. The lateral conduit has openings 52 in the shell end plates 50 at opposite ends of the rotor. The conduits provide a passage along the axial length of the rotor. The lateral conduit may allow fiberous slurry to pass from one end of the rotor to the other. A pressure differential between the ends of the rotor may provide the motive force to drive slurry from one end of the rotor to the other. The flow of slurry from one end of the rotor to the other should reduce the pressure differential between the ends of the rotor. The lateral conduit through the rotor prevents an excessive pressure differential between the ends of the rotor by providing a pressure relief passage.

The lateral conduit through the rotor may be a plurality of conduits 54 (shown schematically in FIG. 6) extending axially through the rotor. The conduit(s) need not be straight, uniform in cross section or have any particular shape, other than to extend from one end of the rotor through the other. The conduit 54 may defined as a hollow volume in the rotor shell and include slots 52 in the annular end plates 50 of the rotor shell 30 that are open to the interior volume 46 of the shell. The end plates 52 may be stainless steel annular plates welded to the end of the rotor shell 30.

The HPF rotor shown in FIGS. 3, and 5 to 7 may be fabricated from plate and conduit, for example, by welding, or the desired geometry may be effected by casting or forging, whatever is most economical. One method of providing this geometry is by using commercially available (preferably metal, such as steel) pipe or tubing or other conduit to form the pockets 41 to 44. If necessary, the structural integrity of each pocket can be strengthened by introducing intermediate supports internally or externally to the pocket passages. Any such support can be formed or machined or coated (e.g. with a solid lubricant such as polytetrafluoroethylene) to be substantially smooth and to provide as little restriction to the flow of slurry into and through the pocket as possible.

Alternatively, the rotor shell and passages may be formed by casting. Conduits extending axially through the rotor may be formed in the casting to provide for pressure equalization. The axial conduits may need to be arranged along the length of the rotor to avoid the passages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A high pressure transfer device comprising:

a pocketed rotor containing a plurality of through going pockets, said rotor rotatable about a given axis of rotation and said pockets having opposite end openings which function as both inlets and outlets depending upon the angular position of the rotor and said pockets are provided in at least first and second sets;

a housing enclosing said rotor and having first through fourth ports disposed around an exterior periphery of the housing, wherein the first through fourth ports register with the inlets to and outlets from said pockets during rotation of the rotor;

said rotor mounted in said housing for rotation with respect to said ports about said given axis of rotation; and said rotor having at least one conduit extending axially through the rotor and having openings at opposite ends of said rotor to provide pressure equalization at said opposite ends.

2. A transfer device as recited in claim 1 wherein said rotor further comprises a cylindrical shell and said at least one conduit is provided by at least one slot in end plates at opposite ends of said rotor, wherein at least one slot in each of said end plates are open to an interior of said shell, wherein said interior provides an opening between said end plates through said shell.

3. A transfer device as recited in claim 1 wherein each said conduit is formed by an internal cavity in said shell.

4. A transfer device as recited in claim 3 wherein cavity is within said shell and extends around said pockets.

5. A high pressure transfer device comprising:

a pocketed rotor containing a plurality of through going pockets, said rotor rotatable about a given axis of rotation and said pockets having opposite end openings which function as both inlets and outlets depending upon the angular position of the rotor;

a housing enclosing said rotor having first through fourth ports disposed around the exterior periphery thereof for registry with the inlets to and outlets from said through going pockets;

said rotor mounted in said housing for rotation with respect to said ports about said given axis of rotation; and said rotor having end plates at opposite axial ends of said rotor, wherein said end plates have at least one slot open to a conduit extending axially through said rotor, such that said at least one slot in said end plates and said conduit provide pressure equalization between said axial ends of the rotor.

6. A method of equalizing pressure within a high pressure transfer device comprising: a pocketed rotor containing a plurality of through going pockets, the rotor rotatable about a given axis of rotation and the pockets having opposite end openings which function as both inlets and outlets depending upon the angular position of the rotor; a housing enclosing the rotor having first through fourth ports disposed around the exterior periphery thereof for registry with the inlets to and outlets from the through going pockets; the rotor mounted in the housing for rotation with respect to the ports about the given axis of rotation; said method comprising:

(a) providing a pressure relieving conduit through an axial length of said rotor; and (b) equalizing a pressure imbalance between opposite axial ends of said rotor by allowing fluids to pass axially through said rotor.

* * * * *